(12) United States Patent
Keuter

(10) Patent No.: US 10,139,045 B1
(45) Date of Patent: Nov. 27, 2018

(54) ART AND A TELEVISION (ARTV) MOUNTING SYSTEM

(71) Applicant: Danny Ray Keuter, Madison, MS (US)

(72) Inventor: Danny Ray Keuter, Madison, MS (US)

( * ) Notice: Subject to any disclaimer, the term of this patent is extended or adjusted under 35 U.S.C. 154(b) by 0 days.

(21) Appl. No.: 15/687,728

(22) Filed: Aug. 28, 2017

(51) Int. Cl.
  *F16M 13/02* (2006.01)
  *A47G 1/24* (2006.01)
  *F16M 11/04* (2006.01)
  *F16M 11/18* (2006.01)
  *F16M 11/08* (2006.01)

(52) U.S. Cl.
  CPC .............. *F16M 13/02* (2013.01); *A47G 1/24* (2013.01); *F16M 11/046* (2013.01); *F16M 11/048* (2013.01); *F16M 11/08* (2013.01); *F16M 11/18* (2013.01)

(58) Field of Classification Search
  CPC .... F16M 13/02; F16M 11/046; F16M 11/048; F16M 11/08; F16M 11/18; A47G 1/24
  See application file for complete search history.

(56) References Cited

U.S. PATENT DOCUMENTS

| | | | | |
|---|---|---|---|---|
| 7,300,029 | B2* | 11/2007 | Petrick | F16M 11/10 248/285.1 |
| 7,312,836 | B2 | 12/2007 | Maxson | |
| 7,337,024 | B1* | 2/2008 | Graham | A47B 81/061 160/239 |
| 7,611,777 | B2 | 11/2009 | Cheng | |
| 7,855,754 | B2 | 12/2010 | Maxson | |
| 8,074,950 | B2* | 12/2011 | Clary | F16M 11/041 248/276.1 |
| 8,123,188 | B2* | 2/2012 | Banfield | A47B 81/065 248/441.1 |
| 2011/0001032 | A1 | 1/2011 | Gardner | |
| 2012/0033371 | A1 | 2/2012 | Pankros et al. | |

FOREIGN PATENT DOCUMENTS

EP  1694064  8/2006

OTHER PUBLICATIONS https://www.hvtvmounts.com, internet site, Hidden televison solutions.
https://new.framemytv.com/products/tv-art-covers, TV art covers.

* cited by examiner

*Primary Examiner* — Anita M King
(74) *Attorney, Agent, or Firm* — Francis Lipinski

(57) ABSTRACT

A device that permits a television to be extended from a position hidden behind a picture frame, and pivots an art picture frame up, and out of view so that a television screen is viewable at a lower level. When the television viewing is complete, the user retracts the television, resulting in a picture frame being pivoted down and coming to rest in front of the hidden television. The devise utilizes only one motorized pulley system to simultaneously move both a television and a picture frame. This devise also utilizes roller extension arms enabling a user to watch a flat TV screen at any level including fully up or down positions. Additionally, optional swivel arms can be utilized to allow a person to tilt the flat screen side to side for easy viewing at an angle.

6 Claims, 5 Drawing Sheets

ART AND A TELEVISION (ARTV) MOUNTING SYSTEM

BACKGROUND OF THE INVENTION

Technical Field

For decades, television manufactures have designed televisions to be thinner and thinner, as if to make them disappear. The television in original marketing form, was enclosed in a large box that contained the cathode ray tube and controls. Miniaturization of technology permitted unsightly televisions to morph into thin screen televisions. Now come a device that allows the television to disappear from view altogether when not in use.

SUMMARY

The art and television (ARTV) mount is a device that supports and manipulates a flat screen television and artwork in a picture frame. The ARTV mount can display either art work in a picture frame, or the device can raise the picture frame, while simultaneously extending a flat screen television, to allow a user to watch the television screen.

When the television is no longer being used, a motorized pulley system retracts the flat screen television, and roller brackets lower the picture frame such that art is displayed, looking like a picture hanging on the wall. This mounting system device allows one to have the choice of viewing either art or a flat screen television in the same wall space.

The mount is a machine that supports both artwork in a picture frame and a flat screen television. In an initial stored position, the ARTV mount and flat screen television are mounted into a four-inch-deep wall space, with the parts compactly fitted behind an art picture frame. Initially, a user sees art in the picture frame hanging in a vertical plane, appearing to be mounted to a wall.

If the user decides to watch television, a motor is energized which extends and lowers a flat screen television and simultaneously lifts the picture frame.

The flat screen television is mounted to a front frame. Also, mounted to the front frame are rollers affixed to roller brackets which are rigidly attached to the front frame. The motor operates a pulley system, which in turn, operates up/down arms, which are flexibly mounted to the front frame. As the front frame carries the flat screen television forward and down, extending out and away from the compact wall storage position, the rollers push the art picture frame up and out.

The art picture frame pivots up as the rollers move along the backside of the art picture frame. The art picture frame is hinged at two places on a top surface of the frame to a wall mount. When the front frame is fully extended, with position controlled by two limit switches, the rollers have raised the pivoted art picture frame up and above the now completely extended flat screen television. A user may now have an unobstructed view of the attached flat screen television at eye level while sitting in a chair. If a user wants to view the television at a higher level, he simply manually lifts the picture frame and pulls out the roller extension arms stored behind the flat screen television. Now when they raise the TV using the motorized pulley system the roller extension arms cause the picture frame to flip further up above the flat screen television, allowing viewing at any level.

To make the television disappear from view, the motor reverses direction, retracting the pulley system, retracting the up/down arms, retracting the front frame, and allowing the art picture frame to pivot back down. When retracting is complete, the ARTV mount is stored in a compact area, the television is hidden, and art work is displayed.

One compact size ARTV mount, is strong enough to support the weight and movement of most flat screen televisions, up to an 85-inch diagonal screen, plus the art in the picture frame up to 50 pounds.

A further embodiment of the ARTV mount includes a set of swivel arms attached between the front frame and back of the television. The swivel arms allow the user to further extend out either side of the television, which enables tilting the television side to side for easier viewing at an angle.

This present invention is directed to Class 248, Supports. While an up and down action is occurring, a picture frame, containing art, rides on rollers. The rollers are rigidly affixed to roller brackets on the front frame. Roller wheels in the roller brackets interface with the backside of the picture frame. When the front frame is extended, the rollers push the hinged picture frame such that the picture frame pivots up and above a now extended television screen. The picture frame is hinged to a wall mount.

The utility of the device is the ability to lift an art frame utilizing rollers that push the art frame, causing the art frame to pivot and lift while simultaneously a television moves forward, caused by the utilization of one motorized pulley system.

The advantages of this invention are the abilities to: hide a flat screen TV behind any artwork, watch the TV at up to 3 feet lower than the stored position, tilt the TV from side to side and fit the whole ARTV Mounting system (with TV) within or on a standard 4-inch wood stud or brick wall. The one ARTV device mounting size will accommodate most size flat screen televisions. The ARTV Mount is ideal for mounting large flat screen TVs above fireplaces.

What is new and unobvious in this present invention is that one motorized actuator (a pulley system), causes the simultaneous movement of an art picture frame by rollers while also causing a television to extended or retract, allowing for viewing or either art or a flat screen television.

BACKGROUND OF THE INVENTION

Prior Art

Keuter, U.S. patent application Ser. No. 14/337,849, A Horizontal Revolving Art Display and Flat Video Screen Mount, Filed Jul. 22, 2014, teaches a horizontal revolving art display and flat video screen display mount allowing a user to view a flat video screen, and then revolve a flat video screen display mount in order to view art.

Patent Application Publication Pankros et al. US2012/0033371, is a display mounting apparatus which includes a wall mount, a support mechanism and a lift mechanism. However, the lift mechanism is different from the present device. The lift mechanism does not raise and lower art, an integral design of the Keuter ATV mount. The device is small and carries '15 kg or more'. The improvement of the Keuter invention is the ability to carry more weight, with smoother operation.

Maxson U.S. Pat. No. 7,312,836 is a television display cover for covering the screen when not in use. None of the design feature of raising the art frame art similar to the Keuter device. Additionally, there is no extension of the television. While Maxson has similar features, the totality of the Keuter device, including the active extending of the television and the simultaneous raising of art are present.

Maxson U.S. Pat. No. 7,855,754 discusses a cover that can be converted from existing frames. While the device may cover, the function of raising and lowering art while simultaneously extending a television is non-existent.

Gardner, U. S. Patent Application 2011/0001032 teaches a lift pedestal to raise and lower a television actuated by a gas prop piston.

Dominic Whittome, E. P. Patent No. 1694064, teaches a flat video screen display mounting system. This patent describes camouflaging unsightly flat screen displays, but uses a sliding method to attain this goal. This device requires substantial space either beside or above the flat screen television.

Cheng, U.S. Pat. No. 7,611,777, teaches an ornamental structure for thin type planar televisions. This rotating device keeps a television from sight when a user is not watching. However, in this invention the art literally hangs, and does not revolve.

An Internet site, https://www.hvtvmounts.com, teaches television mounts that hide a television.

An Internet site, https://new.framemytv.com/products/tv-art-covers, teaches concealing a flat screen television behind pull down shade type oil paintings.

BRIEF DESCRIPTION OF THE DRAWINGS

The objects of this invention and other features, aspects, and advantages will become apparent to those skilled in the art with regard to the following description, appended claims, and accompanying drawings.

DRAWINGS - Reference Numerals

| | | | |
|---|---|---|---|
| 10 | Wall Mount | 15 | Picture frame hinge |
| 17 | Reel | 20 | Back frame |
| 25 | Up/down arms | 30 | Front frame |
| 35 | Gas push out springs | | |
| 40 | TV brackets | 45 | TV cross brackets |
| 50 | DC motor | 55 | Nylon belt |
| 56 | Belt rollers | 60 | Control box & power supply |
| 65 | Limit switches | 70 | Roller brackets |
| 75 | Roller extension arms | 80 | Swivel arms |
| 83 | Swivel arm front frame bracket | 86 | Swivel arm TV frame bracket |
| 90 | Picture Frame | 95 | Flat screen TV |

DETAILED DESCRIPTION

The flat screen TV 95 can be raised or lower using the applicable UP or DOWN buttons on either the hard-wired controller or a handheld wireless controller.

Figure 1:
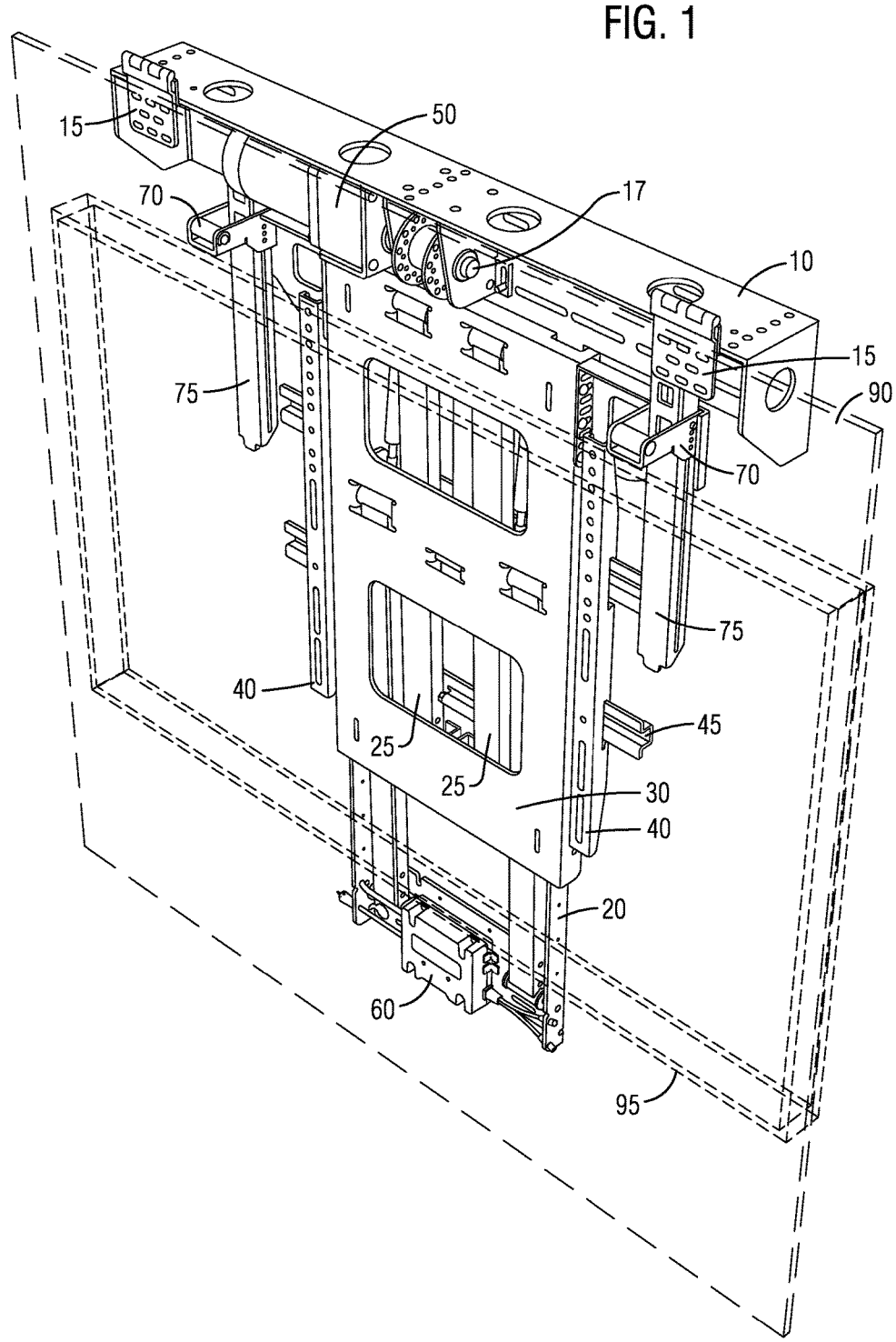
FIG. 1 is a perspective drawing of the ARTV mount, including rollers and the pulley system device, in a fully retracted/up position. A flat screen television is attached to a front frame and is hidden behind a picture frame attached to hinges resting in a vertical plane.

From the retracted/up position (FIG. 1), when a user pushes the DOWN button the DC motor 50 will move in the unwind direction, causing slack in the nylon belt 55 and allowing gravity to lower the front frame 30. As the pulley system extends the front frame 30 out, the up/down arms 25 pivot outwards from the wall. The two gas push out springs 35, connected between the front frame 30 and the top two up/down arms 25, will assist in initially pushing the front frame 30 away from the back frame 20.

Figure 2:
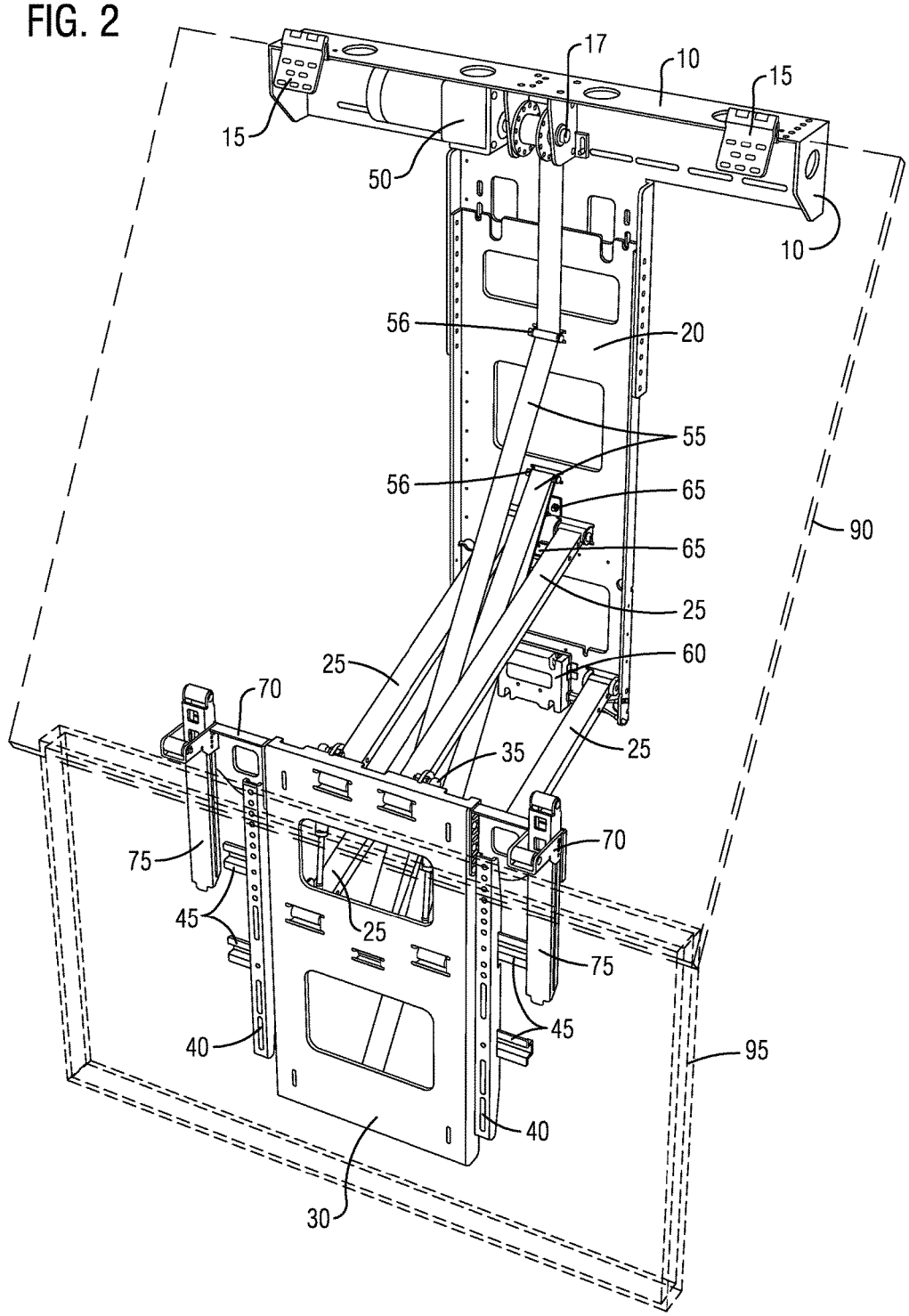
FIG. 2 is a perspective drawing of the ARTV mount, including rollers and the pulley system device, in a fully extended/down position, where the front frame, with a television attached, is viewable. The picture frame is elevated, by rollers mounted in roller brackets, to a position above the flat screen television. In this figure, up/down arms are seen fully pivoted out from the back frame. The belt of the pulley system is seen threaded from the back frame to the front frame, and then to the back frame, and finally firmly affixed to the front frame. The winch, consisting of a direct current motor, a gear box, and a reel is located at the top of FIG. 2, in the wall mount.

Connected to each side of the front frame 30 are the two (2) roller brackets 70. The picture frame 90 works to pivot on two hinges 15 while riding on the two roller brackets 70. The roller brackets 70 contain rollers, which are used to push out the picture frame 90 when a user lowers the flat screen TV 95 for viewing. When the front frame 30 is extended and down, the roller brackets 70, will also push against the back of the picture frame 90 causing it to be push upward and out away from the flat screen TV 95. A user can stop the geared DC motor 50 at any time by pushing any button on any controller. When the front frame 30 is fully extended/down, the picture frame 90 is resting on roller brackets 70, and the picture frame 90 is not blocking the view of the now extended/down flat screen TV 95. FIG. 2 show the ARTV mount in the extended/down position.

Figure 3:
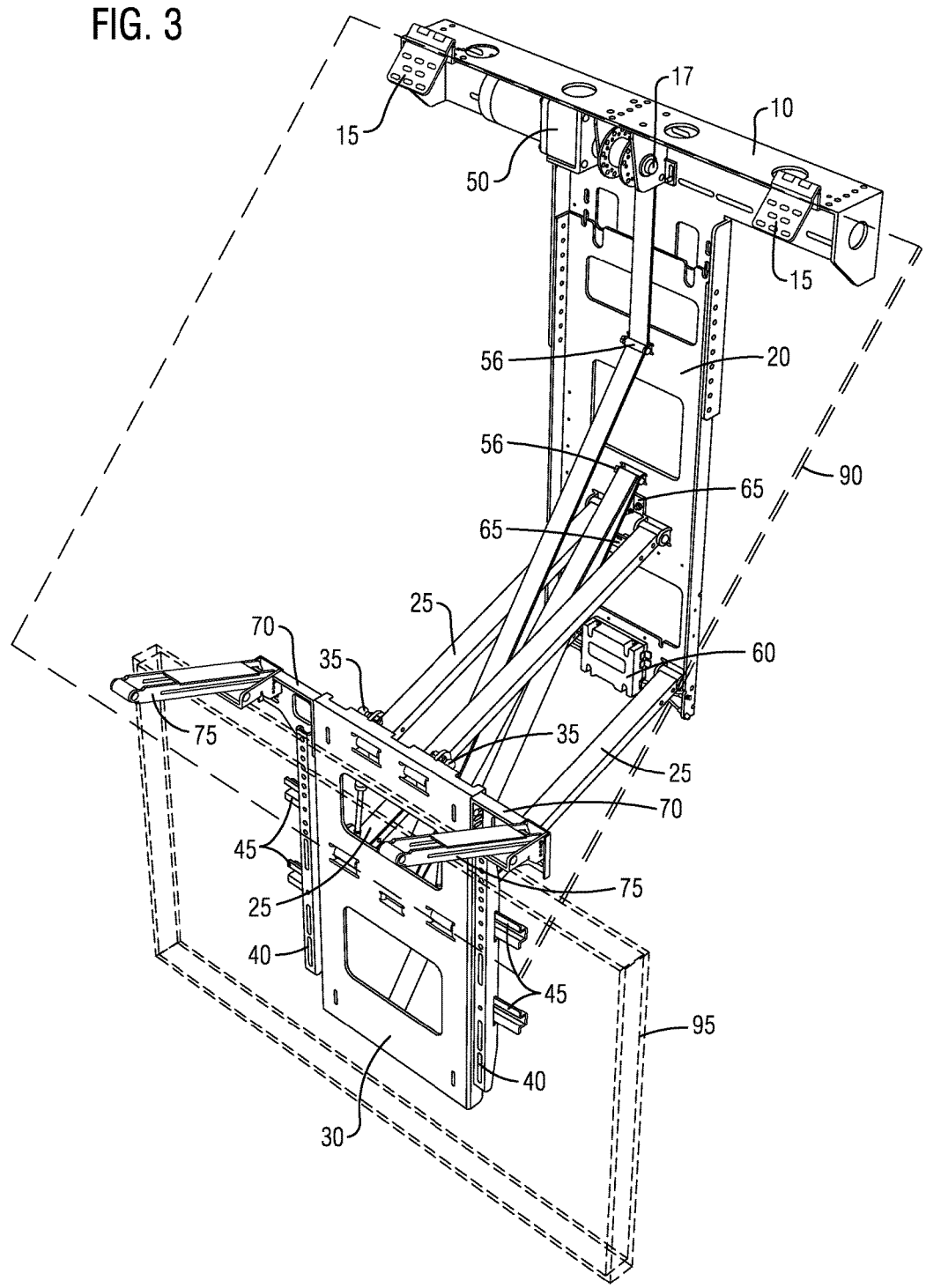
FIG. 3 shows the ARTV mount in an extend/down position with the roller extension arms, that raise the picture frame, in a pulled-out position from the roller brackets, allowing additional length and height advantage when the front frame is moved upward.
Figure 4:
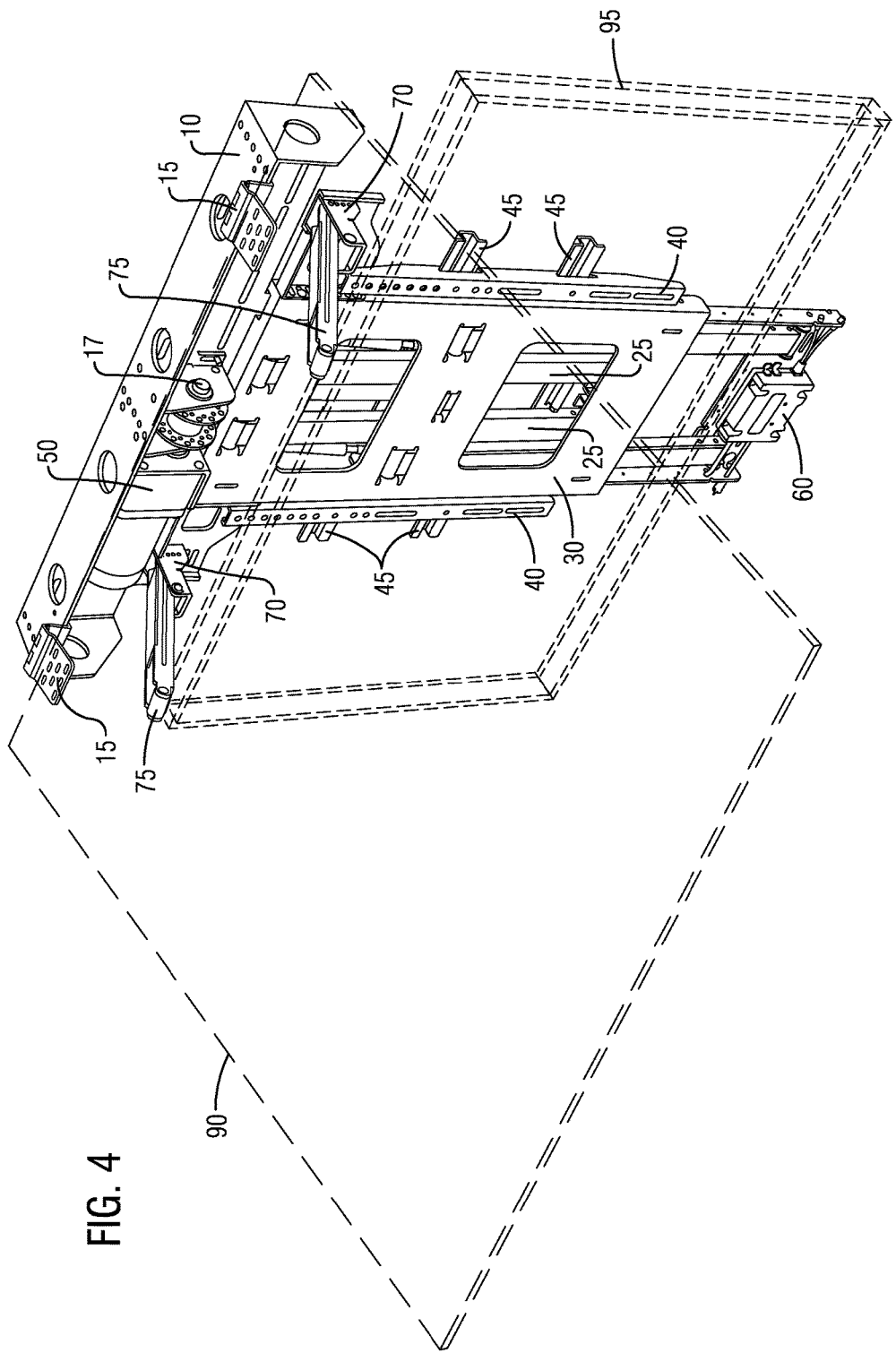
FIG. 4 is a perspective drawing of the ARTV mount in a fully retracted/up position with the roller extension arms pulled out. This drawing demonstrates the additional capabilities of viewing a flat screen television at higher levels utilizing roller extension arms to raise the picture frame out of view.

Mounted within the two roller brackets 70 are also the two roller extension arms 75 that, are used to push out the picture frame 90, when a user desires to watch the flat screen TV 95 at a higher position. From the fully extended/down viewing position (FIG. 2), a user can easily extend the roller extension arms 75 by manually lifting the picture frame 90 and pulling out the roller extension arms 75 from within the roller brackets 70. FIG. 3 show the ARTV mount in the extended/down position with the roller extension arms 75 in the pulled-out position. When the roller extension arms 75 are pulled out and the front frame 30 is raised, by pushing the UP button on one of the controllers, the picture frame 90 will flip up nearly horizontal so a user can see the flat screen TV 95 at various levels including a full up position. FIG. 4 shows the ARTV mount in the retracted/up position with the roller extension arms 75 in the pulled-out position and the picture frame 90 nearly horizontal.

If the flat screen TV 95 is in the full retracted/up viewing position (FIG. 4) and the user desires to return the system to the full up storage position (FIG. 1), he can be accomplished this by using the following procedure: first, lower the front frame 30 to the full down position by pushing the DOWN button on one of the controllers. Next, manually raise the picture frame 90 and place each of the two roller extension arms 75 back in their storage positions within the roller brackets 70. Then, raise front frame 30 back to its full up position by pushing the UP button on one of the controllers.

When the user retracts the front frame 30 utilizing the motorized pulley system, the picture frame 90 pivots on the hinges 15 and moves downward, in constant contact with the roller brackets 70 attached to the front frame 30. When the front frame 30 is fully retracted/up, the picture frame 90 is now resting in a vertical plane, fully visible to a user, while the television 95 is now hidden behind the picture frame 90. The gas push out springs 35 will help slow down the front frame 30 when retracting it to the full retracted/up storage position.

The DC motor winch, consists of a bracket mounted direct current motor 50 and a reel 17. The geared DC motor 50 winds or unwinds a nylon belt 55. The reel 17 operates to extend or retract up/down arms 25, which sequentially extends or withdraws the front frame 30, to which is attached a flat screen television 95. Simultaneously, the device causes the picture frame 90 to lower or raise upon motor action on the reel 17. This action of lowering or raising the picture frame 90 while simultaneously extending or withdrawing the up/down arms 25, is the essence of the invention. The result of the device is either to display a flat screen television 95 or to display art in a picture frame 90 while hiding a flat screen television 95 from a user's view.

A reel 17 that rotates on a horizontal axis is used for unwinding and dispensing the nylon belt 55 or for winding and retracting the nylon belt 55. Each L-shaped bracket is composed of two arms, one arm which is fixed to a horizontal surface of the wall mount 10, and the other arm which projects vertically to support the weight of the reel 17 and nylon belt 55.

Four (4) up/down arms 25 pivot out from the back frame 20 to extend the front frame 30, or pivot in from the back frame 20 to withdraw the front frame 30. The up/down arms 25 are flexibly attached at pivot points in the back frame 20 and in the front frame 30. The up/down arms 25 are compact rectangular, metallic box structures designed to accommodate the weight of the pulley system, including the picture frame 90 and the flat screen TV 95. When the reel 17 unwraps the nylon belt 55, the weight of the flat screen TV causes the up/down arms 25 pivot to extend thereby extending the front frame 30 to which is attached the flat screen television 95. Simultaneously, a picture frame 90 is caused to move and pivot, either in an upward manner upon extension of the up/down arms 25, or downward upon withdrawal of the up/down arms 25.

Four (4) TV cross brackets 45 are rigidly attached to the side lipped edge of the front frame 30 using nuts and bolts. The height locations of the four TV cross brackets 45 are determined depending on the size of the flat screen TV 95. Two (2) standard television brackets 40 are attached to the back of the flat TV screen 95. The television brackets 40 are vertical, metallic parts that support the weight of the television. The television brackets 40 are designed utilizing Flat Display Mounting Interface (FDMI) criteria according to the Video Electronics Standards Association (VESA). Each TV bracket 40 is constructed with indentures to accept the four (4) cross brackets 45.

The two TV brackets 40, with the attached flat screen TV 95 are hung on the four TV cross brackets 45. The four TV cross brackets 45 are then bolted to the two standard TV brackets 40. The front frame 30 is a metallic structure that carries and transfers the weight of a flat screen TV 95 and a picture frame 90 to the up/down arms 25, and then through the back frame 20 and the wall mount 10 to a wall support structure.

The wall mount 10 is a device for attaching the motorized pulley system to a wall. Rectangular in shape, the metal device is shaped to attachment pieces, screws, or nuts and bolts, to hold fast the mount to a typical house wall. The ARTV mounting system is designed to mount on or within a standard 4-inch wood stud or brick wall therefore a compact thin design is essential. The wall mount 10 connects to wall studs when mounted on the outside of a wall or to the wall opening header when mounted within a wall. The wall mount 10 also connects to the back frame 20. The wall mount 10 transfers weight of the motorized pulley system components to a final support structure of a wall.

The wall mount 10 is a structure to support the weight of the back frame 20 and is also the location wherein to mount a reel 17 and a DC motor 50. Hinges 15, to attach an art picture frame 90 are located on a top surface of the wall mount 10.

The picture frame hinge 15 is a jointed device that allows pivoting of the picture frame 90 from the fixed, stationary wall mount 10. By use of a picture frame hinge 15, the picture frame 90 pivots when forced by the roller brackets 70 or the roller extension arms 75.

A back frame 20 supports and is connected to four (4) up/down arms 25, belt rollers 56, control box & power supply 60 and two (2) limit switches 65. The back frame 20 is a metal structure that transfers weight from the invention to a rigid wall foundation. The back frame 20 is connected rigidly to the wall mount 10. From this rigid structure, four (4) up/down arms 25 can pivot out to extend the front frame 30, or pivot in to retract the front frame 30. This allows the front frame 30 to go up or down by up to 36 inches and extend from the wall by up to 20 inches. Belt rollers 56 are rigidly affixed into the back frame 20 and front frame 30. The nylon belt 55 passes around the belt rollers 56 in the back frame 20, and belt rollers 56 in the front frame 30, to create a multi-pully power transfer system. Two (2) limit switches 65 are affixed to the back frame 20 to provide position indication of up/down arms 25. The signal from the limit switches 65 is provided to the DC motor 50 to allow automatic controlled reel 17 operation. Lastly, a control box & power supply 60 is affixed to the bottom of the back frame 20. Either a hard wired or wireless handheld control device can be utilized to supply user input (i.e. up, down, start, stop) to the control box & power supply 60.

Figure 5:
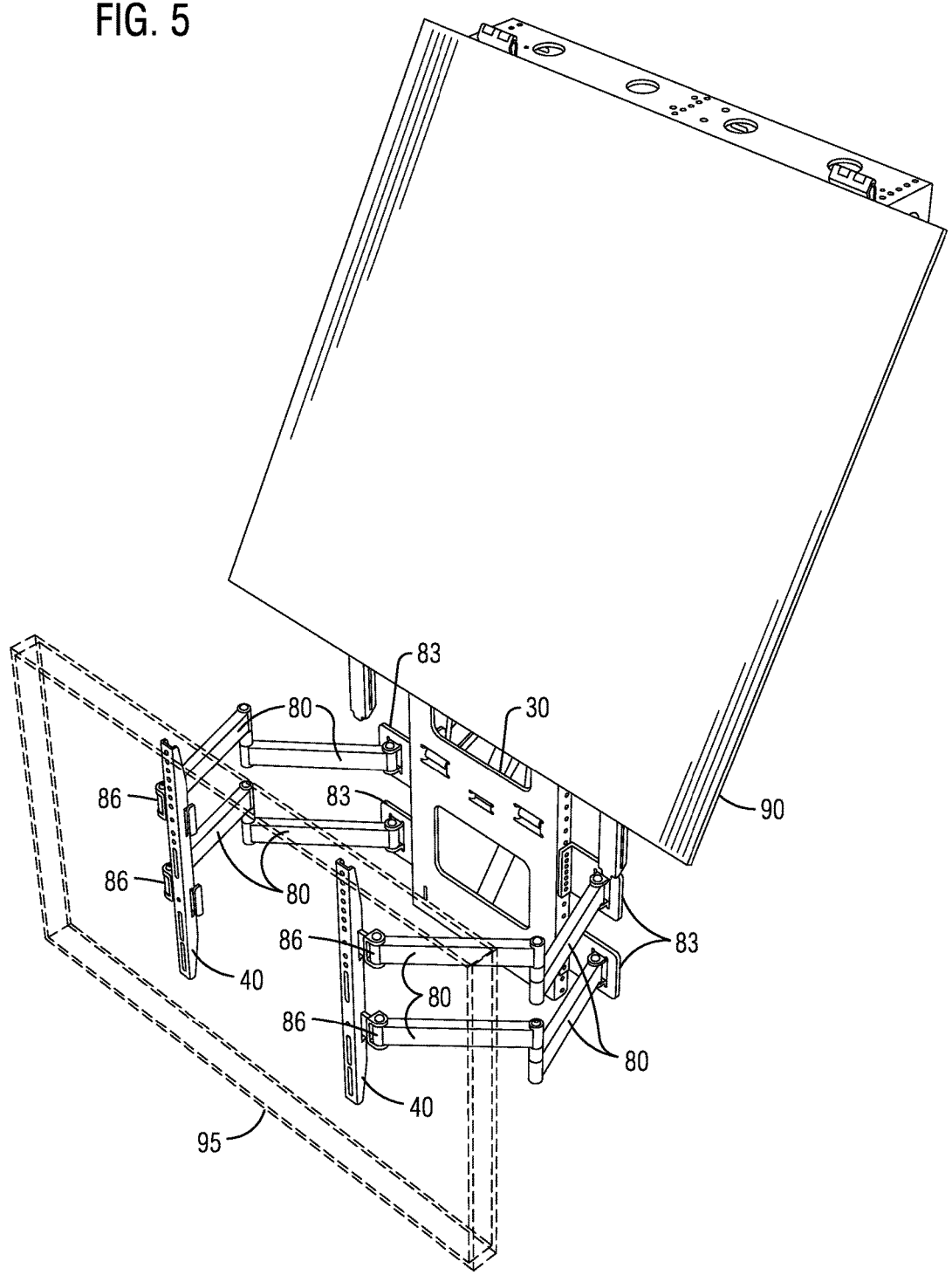
FIG. 5 shows a further embodiment of the ARTV mount, showing television viewing capability where the swivel arms are attached to the front frame and back of the flat screen television. When the ARTV mount is fully extended/down, the television can be pivoted in a horizontal plane utilizing the swivel arms, for easier viewing at an angle.

A further embodiment of the ARTV Mount system is to utilize swivel arms 80 to extend either side of the television 95 further forward away from the front frame 30 and is shown in FIG. 5. This swivel option enables a user to manually angle the flat screen TV 95 from side to side. In this embodiment, the two (2) TV brackets 40 are bolted to the four-swivel arm TV frame brackets 86. The four-swivel arm TV frame brackets 86 are attach to the four (4) swivel arms 80 at one end and attach to the four-swivel arm front frame brackets 83, at an opposite end. The four-swivel arm front frame brackets replace the four original TV cross brackets 45 and are rigidly attached to the side lipped edge of the front frame 30 using nuts and bolts. Use of swivel arms permits easier viewing of the flat screen 95, from an angle.

CONCLUSION, RAMIFICATIONS AND SCOPE

Although the present invention has been described in considerable detail with reference to certain preferred versions thereof, other versions are possible. Therefore, the spirit and scope of the appended claims should not be limited to the description of the preferred version contained therein.

The reader's attention is directed to all papers and documents which are filed concurrently with this specification and are open to public inspection with this specification, and the contents of all such papers and documents are incorporated herein by reference. All features disclosed in this specification (including any accompanying claims, abstract, and drawings) may be replaced by alternative features serving the same, equivalent or similar purpose, unless expressly stated otherwise. Each feature disclosed is one example only of a generic series of equivalent or similar features.

While the above description contains much specificity, these should not be construed as limitations on the scope of any embodiment but as exemplifications of the presently preferred embodiments thereof. Other ramifications and variations are possible within the teachings of the various embodiments. Thus, the scope of the invention should be determined by the appended claims and their legal equivalents, not by the examples given.

I claim:

1. An art picture frame and television mounting device comprising:
   a) roller brackets mounted to a front frame for rolling beneath an art picture frame for raising and lowering said art picture frame,
   b) a motorized pulley system attached to a wall mount, a back frame, and said front frame for extending and retracting said front frame while simultaneously raising and lowering said art picture frame,
   c) roller extension arms, for raising said art picture frame, and
   d) swivel arms attached to said front frame that permit a flat screen television to pivot side to side in a horizontal plane, and
   e) a combination of said back frame, said front frame, up/down arms, television bracket cross arms, and television brackets that permit said mounting device to fold up into a space of one and one-half inch depth, and with said flat screen television attached, fit within a standard 4-inch construction wood stud wall.

2. The device of claim 1 whereby said roller brackets are attached to said front frame such that said roller brackets allow said picture frame to ride on said roller brackets when said front frame is extended or retracted by utilizing said pulley system.

3. The device of claim 1 whereby said pulley system further comprises a winch comprising a motor, a reel, and a belt, and further whereby said winch operates to wind in or to unwind said belt, said belt which is flat in form.

4. The device of claim 1 whereby said pulley system is further comprised of a belt wrapped on a reel at one end, and threaded through a roller attached to said back frame and then further threaded through a similar said roller on said front frame, and then further threaded through an additional similar said roller on said back frame, and then said belt is firmly affixed to said front frame, whereby said belt retracts or extends said front frame supported on said up/down arms when said belt is wrapped or unwrapped on said reel.

5. The device of claim 1 whereby said roller extension arms are manually raiseable or lowerable from resting positions in said roller brackets and whereby said roller extension arms are utilized to raise or lower a height of said picture frame above said front frame.

6. The device of claim 1 whereby said swivel arms affixed to said front frame are utilized to extend either side of said television from said front frame allowing said flat screen television to pivot side to side in a horizontal plane, making easier viewing at an angle.

* * * * *